US012627615B2

(12) United States Patent
Koch et al.

(10) Patent No.: US 12,627,615 B2
(45) Date of Patent: May 12, 2026

(54) MICROSERVICE DEPLOYMENT IN DISTRIBUTED COMPUTING ENVIRONMENTS

(71) Applicant: INTERNATIONAL BUSINESS MACHINES CORPORATION, Armonk, NY (US)

(72) Inventors: Fernando Luiz Koch, Palm Beach Gardens, FL (US); Aladin Djuhera, Dachau (DE); Alecio Pedro Delazari Binotto, Munich (DE)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 18/444,845

(22) Filed: Feb. 19, 2024

(65) Prior Publication Data

US 2025/0219963 A1 Jul. 3, 2025

(30) Foreign Application Priority Data

Jan. 3, 2024 (GB) ..................................... 2400048

(51) Int. Cl.
H04L 47/783 (2022.01)
G06N 3/092 (2023.01)
H04L 41/5054 (2022.01)

(52) U.S. Cl.
CPC ........... H04L 47/783 (2013.01); G06N 3/092 (2023.01); H04L 41/5054 (2013.01)

(58) Field of Classification Search
CPC .... H04L 41/5054; H04L 47/783; G06N 3/092
See application file for complete search history.

(56) References Cited

U.S. PATENT DOCUMENTS 10,225,335 B2 * 3/2019 Fu .......................... G06F 9/5072
11,076,019 B2 * 7/2021 Cai ..................... H04L 41/0816
(Continued)

FOREIGN PATENT DOCUMENTS

ES 2830438 T3 6/2021
KR 20220027818 A 3/2022
WO 2023/048609 A1 3/2023

OTHER PUBLICATIONS

Arslan Qadeer and Myung Jong Lee. "Deep-Deterministic Policy Gradient Based Multi-Resource Allocation in Edge-Cloud System: A Distributed Approach", DOI 10.1109/ACCESS.2023.3249153, Department of Electrical Engineering, The City College of New York, New York, NY, USA, 18 pages. (Year: 2023).*
(Continued)

*Primary Examiner* — G. C. Neurauter, Jr.
(74) *Attorney, Agent, or Firm* — Daniel M. Yeates

(57) ABSTRACT

A computer implemented method of deployment and resource allocation of microservices of a distributed computing environment is disclosed. The distributed computing environment includes a microservice deployment scheduler and one or more computing nodes. The microservice deployment scheduler includes a reinforcement learning based dynamic workload orchestration module. The method includes receiving microservice constraints descriptive of a microservice computing task by the microservice deployment scheduler. The method further includes receiving node specific properties from the one or more computing nodes by the microservice deployment scheduler. The node specific properties are descriptive of a computing capacity and/or computing capabilities of the one or more computing nodes. The method further includes orchestrating operation of the one or more computing nodes by the microservice deployment scheduler by inputting the microservice constraints and
(Continued)

the node specific properties into the reinforcement learning based dynamic workload orchestration module.

18 Claims, 5 Drawing Sheets

(56) References Cited

U.S. PATENT DOCUMENTS

| | | | |
|---|---|---|---|
| 11,533,234 B2 | 12/2022 | Cencini | |
| 11,537,809 B2 * | 12/2022 | Gan | G06F 18/24147 |
| 11,704,123 B2 | 7/2023 | Pamidala et al. | |
| 11,843,548 B1 * | 12/2023 | Devendranath | H04L 47/822 |
| 12,141,458 B1 * | 11/2024 | Kankani | G06F 3/067 |
| 12,271,795 B1 * | 4/2025 | Long | G06N 20/00 |
| 12,333,457 B1 * | 6/2025 | Monyei | G06Q 30/0206 |
| 12,375,968 B2 * | 7/2025 | Orhan | G06N 3/006 |
| 2019/0197448 A1 * | 6/2019 | Nelaturi | G06Q 10/067 |
| 2021/0019194 A1 | 1/2021 | Bahl et al. | |
| 2022/0124009 A1 | 4/2022 | Metsch | |
| 2022/0318060 A1 | 10/2022 | Choochotkaew | |
| 2022/0345518 A1 | 10/2022 | Sgobba | |
| 2023/0012487 A1 | 1/2023 | Makaya | |
| 2023/0385116 A1 | 11/2023 | Rao et al. | |
| 2024/0118938 A1 * | 4/2024 | Coviello | G06F 16/24568 |
| 2024/0403131 A1 * | 12/2024 | Eker | H04L 41/16 |

OTHER PUBLICATIONS

Richard P. Lippman. "Pattern Classification Using Neural Networks", IEEE Communications Magazine, Nov. 1989, pp. 47-64, 18 pages. (Year: 1989).*

Anwar Ghammam et al. "Dynamic Software Containers Workload Balancing via Many-Objective Search", IEEE Transactions of Services Computing vol. 16, No. 4, Jul./Aug. 2023, 17 pages. (Year: 2023).*

Hamid Mohammadi Fard et al. "Dynamic Multi-objective Scheduling of Microservices in the Cloud", 2020 IEEE/ACM 13th International Conference on Utility and Cloud Computing (UCC), 8 pages. (Year: 2020).*

Gasmi et al., "Reinforcement Learning-Based Approach for Microservices-Based Application Placement in Edge Environ- ment", 2023 IEEE Symposium on Computers and Communications (ISCC), Jul. 9, 2023, pp. 1098-1103.

International Searching Authority, "Notification of Transmittal of the International Search Report and the Written Opinion of the International Searching Authority, or Declaration," Patent Cooperation Treaty, Feb. 27, 2025, 12 pages, International Application No. PCT/ EP2024/087283.

Qiu et al., "FIRM: An Intelligent Fine-Grained Resource Management Framework for SLO-Oriented Microservices", arxiv.org, Oct. 20, 2020, pp. 20.

Yang et al., "MIRAS: Model-based Reinforcement Learning for Microservice Resource Allocation over Scientific Workflows", 2019 IEEE 39th International Conference on Distributed Computing Systems, Jul. 7, 2019, pp. 122-132.

United Kingdom Patent Office, "Search Report issued," Jul. 4, 2024, 3 Pages, Application No. 2400048.1.

Chen, et al., "Deep Reinforcement Learning-Based Dynamic Resource Management for Mobile Edge Computing in Industrial Internet of Things." Published Jul. 2021. 10 pages. In IEEE Transactions on Industrial Informatics, vol. 17, No. 7, pp. 4925-4934, doi: 10.1109/ TII.2020.3028963.

Da Silva, et al., "Resource Allocation Mechanism for a Fog-Cloud Infrastructure." Published in 2018 by IEEE. 6 pages. In 2018 IEEE International Conference on Communications (ICC), Kansas City, MO, USA, pp. 1-6, doi: 10.1109/ICC.2018.8422237.

Guo, et al., "Deep reinforcement learning-based microservice selection in mobile edge computing." Published Jul. 2021 by IEEE. 17 pages. In IEEE Transactions on Industrial Informatics, vol. 17, No. 7, pp. 4925-4934, doi: 10.1109/TII.2020.3028963.

Wu, et al., "Optimal deploying IoT services on the fog computing: A metaheuristic-based multi-objective approach." Published Nov. 2022 by Science Direct. 44 pages. In Journal of King Saud University— Computer and Information Sciences, vol. 34, Issue 10, Part B, Nov. 2022, pp. 10010-10027. https://doi.org/10.1016/j.jksuci.2022.10. 002.

Koch, et al., "Microservice Deployment in Distributed Computing Environments," Application No. GB2400048.1, filed Jan. 3, 2024.

Anonymous. "OptaPlanner introduction." Accessed Feb. 16, 2024. 11 pages. Published by Opta Planner. https://www.optaplanner.org/ docs/optaplanner/latest/planner-introduction/planner-introduction. html.

* cited by examiner

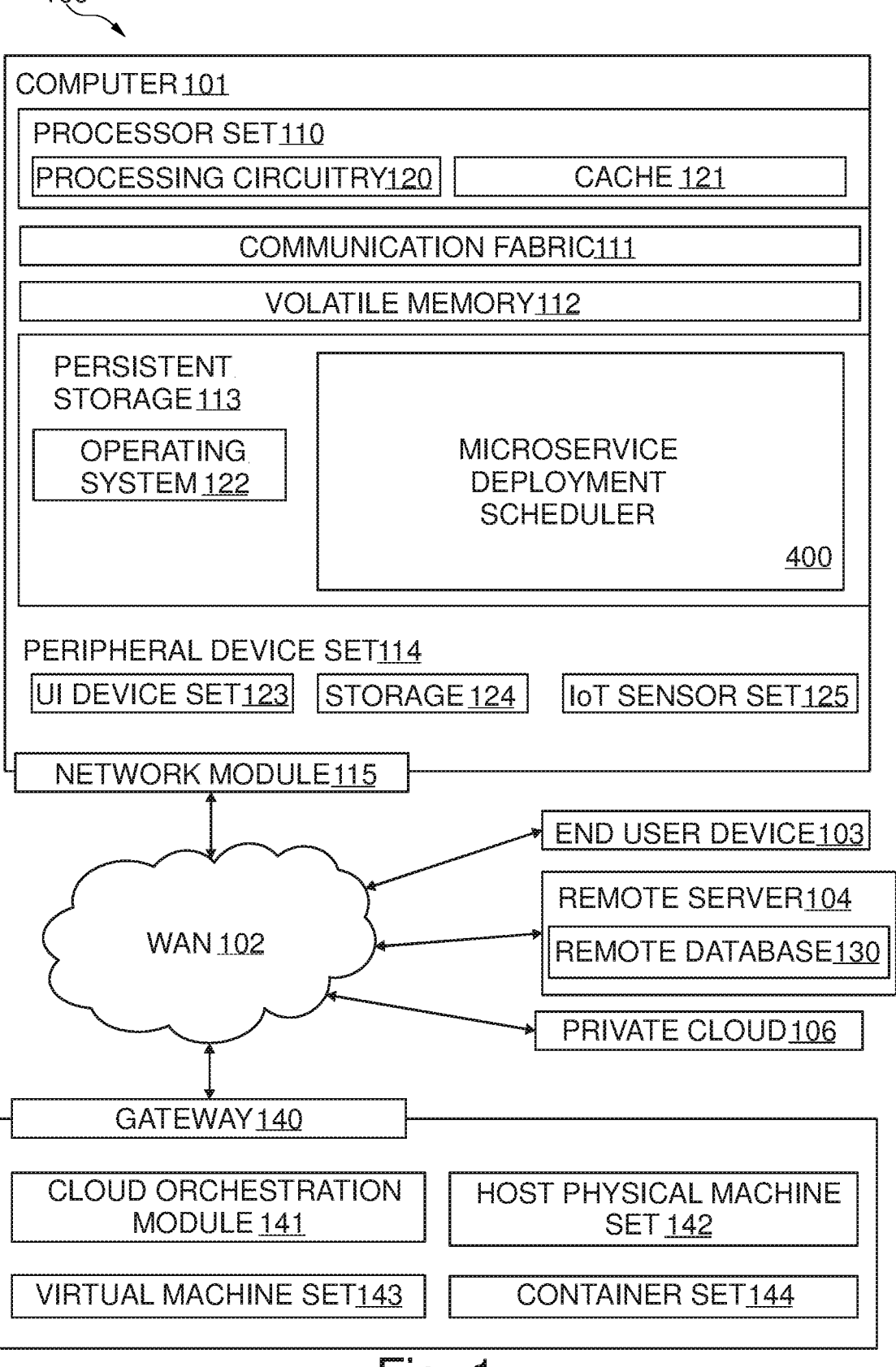

100

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

MICROSERVICE DEPLOYMENT SCHEDULER

400

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

CLOUD ORCHESTRATION MODULE 141    HOST PHYSICAL MACHINE SET 142

VIRTUAL MACHINE SET 143    CONTAINER SET 144

Fig. 1

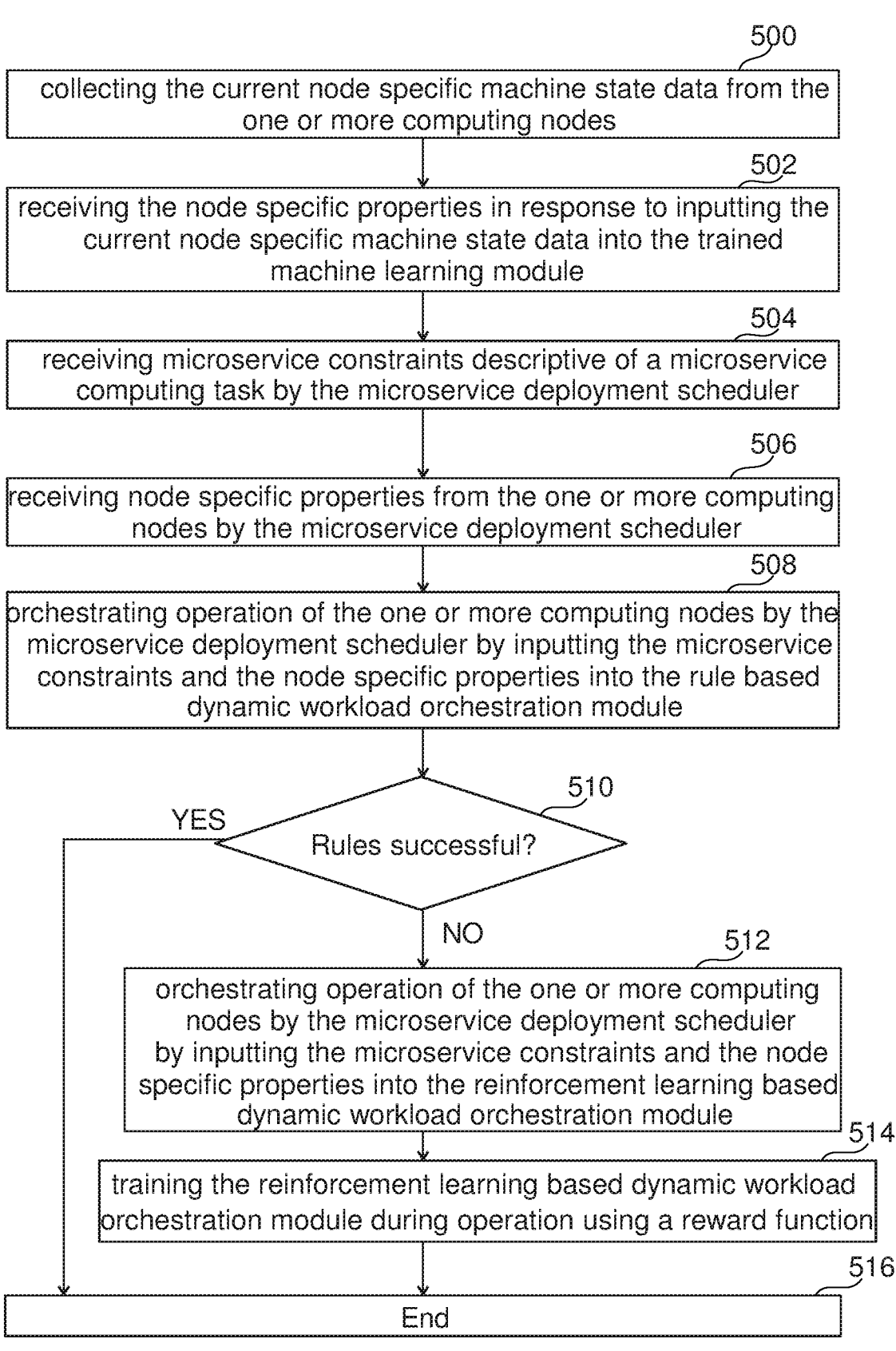

500 collecting the current node specific machine state data from the one or more computing nodes

502 receiving the node specific properties in response to inputting the current node specific machine state data into the trained machine learning module

504 receiving microservice constraints descriptive of a microservice computing task by the microservice deployment scheduler

506 receiving node specific properties from the one or more computing nodes by the microservice deployment scheduler

508 orchestrating operation of the one or more computing nodes by the microservice deployment scheduler by inputting the microservice constraints and the node specific properties into the rule based dynamic workload orchestration module

510

Rules successful?

YES

NO

512 orchestrating operation of the one or more computing nodes by the microservice deployment scheduler by inputting the microservice constraints and the node specific properties into the reinforcement learning based dynamic workload orchestration module

514 training the reinforcement learning based dynamic workload orchestration module during operation using a reward function

516

End

Fig. 5

MICROSERVICE DEPLOYMENT IN DISTRIBUTED COMPUTING ENVIRONMENTS

BACKGROUND

The present disclosure relates to the field of digital computer systems, and more specifically, to a method for managing microservice deployment in a distributed computing system.

A challenge in distributed computing, such as in edge computing, is managing the deployment lifecycles of microservice workloads across a vast number of computing nodes (such as edge nodes). In this context, computing nodes possess certain properties assigned by (edge) administrators, while microservices have certain associated metadata which are defined by developers. This metadata correspondingly defines a set of constraints on the edge node and its properties, which in turn determines which microservices can eventually be deployed onto a specified edge node.

SUMMARY

In one aspect the disclosure provides for a computer-implemented method of deployment and resource allocation of microservices of a distributed computing environment. The distributed computing environment comprises a microservice deployment scheduler and one or more computing nodes. The microservice deployment scheduler comprises a reinforcement learning-based dynamic workload orchestration module. The method comprises receiving microservice constraints descriptive of a microservice computing task by the microservice deployment scheduler. The method further comprises receiving node-specific properties from the one or more computing nodes by the microservice deployment scheduler. The node-specific properties are descriptive of a computing capacity and/or computing capabilities of the one or more computing nodes. The method further comprises orchestrating operation of the one or more computing nodes by the microservice deployment scheduler by inputting the microservice constraints and the node-specific properties into the reinforcement learning-based dynamic workload orchestration module.

In another aspect, the disclosure provides for a computer program product comprising a computer-readable storage medium having computer-readable program code embodied therewith. Said computer-readable program code is configured to implement embodiments of the computer-implemented method.

In another aspect, the disclosure provides for a computer system. The computer system comprises a processor configured for controlling the computer system. The computer system further comprises a memory storing machine-executable instructions and a microservice deployment scheduler. The microservice deployment scheduler comprises a reinforcement learning-based dynamic workload orchestration module. The execution of the instructions causes the processor to receive microservice constraints that are descriptive of a microservice computing task by the microservice deployment scheduler. The execution of the instructions further causes the processor to receive node-specific properties from the one or more computing nodes by the microservice deployment scheduler. The node-specific properties are descriptive of computing capacity and computing capabilities of the one or more computing nodes. Execution of the instructions further causes the processor to orchestrate operation of the one or more computing nodes via the microservice deployment scheduler by implementing the microservice constraints and the node-specific properties into the reinforcement learning-based dynamic workload orchestration module.

BRIEF DESCRIPTION OF THE DRAWINGS

In the following, embodiments of the disclosure are explained in greater detail, by way of example only, making reference to the drawings in which:

FIG. 1 illustrates an example of a computing environment.

FIG. 5 shows a flow chart which illustrates a method of using the computing environment.

DETAILED DESCRIPTION

Figure 2:
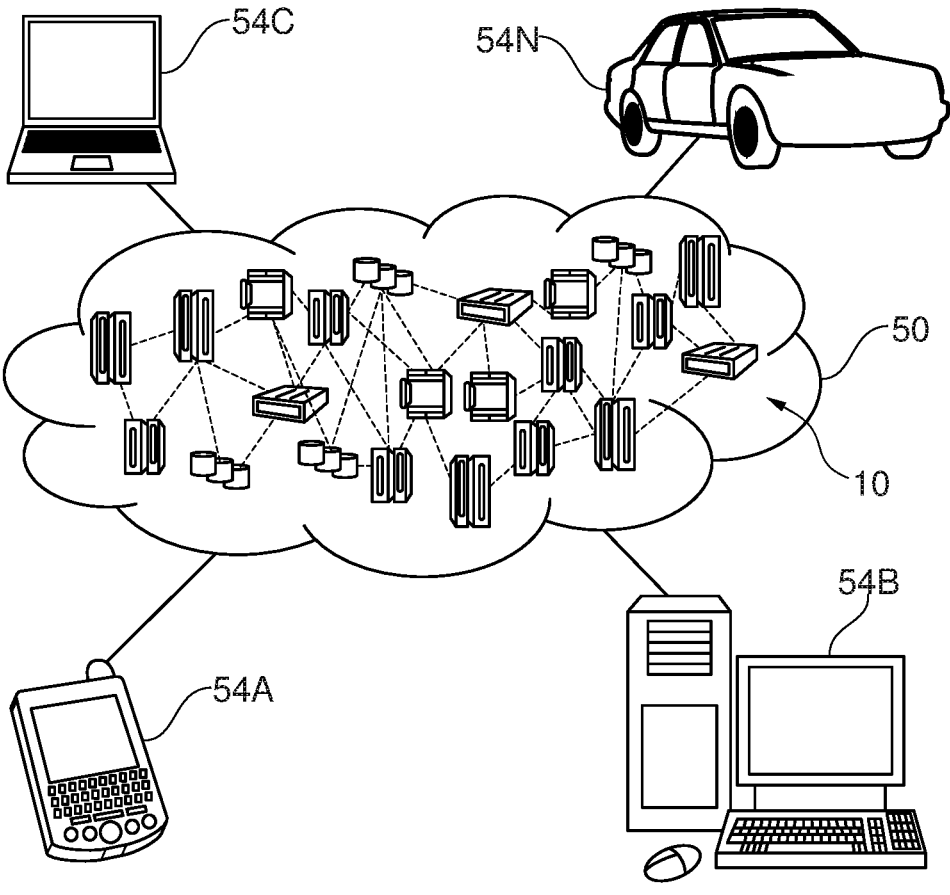
FIG. 2 depicts a cloud computing environment according to an example of the present disclosure.

The descriptions of the various embodiments of the present disclosure will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Examples may provide for a computer-implemented method of deployment and resource allocation of microservices of a distributed computing environment. A microservice, as used herein, may refer to a collection of software applications that may have one or more of the following properties: they may be independently deployable from each other, they may be loosely coupled, they may operate collectively, and in some instances, they may be organized around particular capabilities or computational tasks. The microservices may, for example, be combined together to perform larger tasks and may be used in different combinations. This, for example, may have the advantage of being able to rapidly develop and deploy different capabilities for a distributed computing environment. The distributed computing environment comprises a microservice deployment scheduler.

The microservice deployment scheduler, as used herein, encompasses a software component that is capable of scheduling services in a microservice or distributed computing environment. The one or more computing nodes may be nodes where the microservices are provided. For example, in some cases the computing nodes may have or provide the microservices as containerized applications. For example, there may be various virtual machines on a particular computing node which may be used to provide various microservices on an on-demand basis.

The microservice deployment scheduler comprises a reinforcement learning-based dynamic workload orchestration module. This is a dynamic workload orchestration module that functions by being trained using reinforcement learning.

The method comprises receiving microservice constraints that are descriptive of a microservice computing task via the microservice deployment scheduler. The microservice constraints define the computing requirements for performing a particular task. The method further comprises receiving node-specific properties from the one or more computing nodes by the microservice deployment scheduler. The node-specific properties are descriptive of a computing capacity and/or computing capabilities of the one or more computing nodes. The microservice constraints define the computing needs, and the node-specific properties basically define what computing resources are available on different nodes. The method further comprises orchestrating operation of the one or more computing nodes by the microservice deployment scheduler by inputting the microservice constraints and the node-specific properties into the reinforcement learning-based dynamic workload orchestration module.

The computer-implemented method may have one or more of the following benefits because of the use of the reinforcement learning-based dynamic workload orchestration module:

1. Examples may enable efficient resource utilization by considering (edge) computing node properties and microservice constraints, minimizing wastage and enhancing overall system efficiency.
2. Examples may ensure scalability by dynamically allocating microservices to appropriate (edge) computing nodes, thereby achieving load balancing and accommodating a growing number of microservices.
3. The system demonstrates flexibility and adaptability through the dynamic adaptation module, allowing it to respond to changes in edge node properties or microservice requirements and maintain an optimized deployment over time.
4. The solution improves the quality of service delivered to end-users by deploying microservices on (edge) computing nodes that can meet their specific requirements, enhancing performance and user experience.

Examples may further have the benefit that the reinforcement learning-based dynamic workload orchestration module has been trained to efficiently or effectively orchestrate operation of the one or more computing nodes. This may be particularly advantageous because in complex or large distributed computing environments it may not be possible to specify a rule for every combination of how to distribute the workload, manage the deployment of microservice, or manage other aspects of the distributed computing environment between the different computing nodes. The reinforcement learning-based dynamic workload orchestration module may then be capable of continually adapting and learning how to better manage the different computing nodes.

In another example, the microservice deployment scheduler further comprises a rule-based dynamic workload orchestration module that is configured for orchestrating operation of the one or more computing nodes using the predetermined set of rules associated with the microservice constraints and the node-specific properties. The method further comprises orchestrating operation of the one or more computing nodes by the microservice deployment scheduler by inputting the microservice constraints and the node-specific properties into the rule-based dynamic workload orchestration module. The orchestration of the one or more computing nodes using the reinforcement learning-based dynamic workload orchestration module is performed if the predetermined set of rules is not associated with the microservice constraints and the node-specific properties.

In this example, a rule-based system is first used to determine how to orchestrate the workload between the various computing nodes. If the rule determines that the particular case is not covered by the rules, then the reinforcement learning-based dynamic workload orchestration module takes over and then distributes the workload between the different computing nodes. This has the advantage that for very simple or very common cases a set of rules can be established. However, in the eventuality that the rules do not cover something, this may ensure that the microservice deployment scheduler continues to function effectively and efficiently. The reinforcement learning-based dynamic workload orchestration module may become better with time as it is used more, and it may adapt to the particular distributed computer environment. This may provide for a particularly effective or efficient distribution of distributing the workload between the various computing nodes.

In another example the predetermined set of rules implements a multi-objective problem statement. A multi-objective problem statement defines an optimization problem involving two or more objective functions to be optimized simultaneously. In this example the predetermined set of rules are able to select or distribute the load amongst the one or more computing nodes to optimize multiple objective functions or goals. This may be advantageous because it may provide for a more flexible or more effective distribution of computing load between the different computing nodes.

In another example, the method further comprises training the reinforcement learning-based dynamic workload orchestration module during operation using a reward function. When a reinforcement learning system is operating the behavior or predictions or control by the reinforcement learning system is gauged by a reward function. By maximizing the value of the reward function the reinforcement learning-based dynamic workload orchestration module is trained to perform continually better. The reward function comprises any one of the following: resource utilization of the computing nodes, response time to the microservice constraints, cost efficiency of the computing nodes, energy consumption of the computing nodes, and combinations thereof. This example may be particularly beneficial because multiple of these values may be used for constructing the reward function. The reinforcement learning-based dynamic workload orchestration module may therefore provide for a means of optimizing a large number or a variety of different measures of success or effectiveness of the one or more computing nodes.

In another example, the distributed computing environment is configured to receive microservice applications from a database of microservices for execution by the one or more computing nodes. The database of microservices may for example be distributed from a central location to different distributing computing environments. The database of microservices may provide for a central means of updating or providing the microservices to the distributed computing environment.

In another example, the microservice deployment scheduler is executed on a dedicated computing node. The dedicated computing node functions as a gateway between the database of microservices and the one or more computing nodes. In this example, the one or more computing nodes are isolated from the database of microservices by the microservice deployment scheduler. The microservice deployment scheduler may therefore provide for security and provide a means of isolating the one or more computing nodes. This may also for example provide for ways of defining the distributed computing environment as an edge computing system where the individual computing nodes are edge computing nodes.

In edge computing the computing services are located near their use as opposed to being distant in a central server or central location.

In another example, execution of the microservice deployment scheduler is distributed amongst the one or more computing nodes. In this example, the functionality of the microservice deployment scheduler is distributed by having its computing resources being located on one or more of the computing nodes. This may for example provide for a more cost-effective and flexible means of setting up the distributed computing environment. In this example, a dedicated computing node for implementing the microservice deployment scheduler is not needed.

In another example, the distributed computing environment comprises a trained machine learning module configured to output the node-specific properties in response to receiving a current node-specific machine state data as input. The method comprises collecting the current node-specific machine state data from one or more computing nodes and receiving the node-specific properties in response to inputting the current node-specific machine state data into the trained machine learning module.

In this example, the trained machine learning module is used to take data, which is descriptive of a particular node, which is referred to as the current node-specific machine state data, and then output the node-specific properties. This may provide for a variety of benefits. The trained machine learning module may firstly be used to classify the state of the particular computing node. The classification of the computing node is the node-specific properties for that node. Another advantage of doing this is that the node-specific properties may for example be transmitted to the microservice deployment scheduler and not the complete current node-specific machine state data. This may enable the effective functioning of the microservice deployment scheduler where the amount of data between the different nodes in the distributed computing environment is reduced. Instead of having to transmit the complete current node-specific machine state data only the node-specific properties are transmitted instead.

In another example, the trained machine learning module comprises a classifier neural network. A variety of different types of neural networks, which output a classification, may be used to perform this. For example, a neural network that has multiple connected layers may be used. For example, a neural network with at least three hidden layers of fully connected layers. In other examples, standard neural network architectures for classification such as convolutional neural networks may also be used.

The classifier neural network can for example be trained by collecting current node-specific machine state data from different computing nodes and then manually assigning the node-specific properties for the training data. A deep learning type training routine may then be used. During the training the following loss functions may, for example, be used: the binary cross-entropy loss function, the hinge loss function, the mean square error loss function, or the L2 loss function.

In another example, the current node-specific machine state data comprises any one of the following: the current resource utilization data, the current workload data, the current performance metric data, the current processing power, the current memory capacity of a particular computing node, the current storage capacity of that node, the current network bandwidth, the current microservice resource requirements, the current microservice response time objective, the current microservice execution dependencies, the current microservice communication patterns, the current installed microservices, the current response time through, the current throughput, the current energy consumption, the current cost of processing, the current cost of storage. The use of the word "current" above is intended to be used as a label to indicate data which has been acquired within a predetermined time period or is the most recent data that has been acquired.

In another example, the trained machine learning module is implemented on each of the one or more computing nodes. The method further comprises receiving the node-specific properties in response to inputting the node-specific machine state data into the trained machine learning module of the respective computing node. This example may be advantageous because the individual computing nodes will transmit only the node-specific properties instead of the complete node-specific machine state data.

In another example, the trained machine learning module is further configured to receive historical machine state data as input when inputting the current node-specific machine state data into the trained machine learning module. This may be advantageous because it may provide for a means of using historical data which is typical for the particular distributed computing environment to be incorporated into the way in which the microservice deployment scheduler distributes work. The method further comprises inputting the historical machine state data into the trained machine learning module when inputting the current node-specific machine state data into the trained machine learning module to determine the node-specific properties.

In another example, the historical machine state data comprises any one of the following: historical restores utilization data, historical workload data, historical performance metric data, historical processing power, historical memory capacity, historical storage capacity, historical network bandwidth, historical microservice resource requirements, historical microservice response time objective, historical microservice execution dependencies, historical microservice communication patterns, historical installed microservices, historical response time, historical throughput, historical energy consumption, historical cost of processing, historical cost of storage. The use of the word "historical" above is intended to be used as a label to indicate data which has been acquired before the predetermined time period described with respect to the "current data" or is not the most recent data that has been acquired. It could be data that has been archived.

In another embodiment, the distributed computing environment is a distributed edge computing environment. The computing nodes are edge nodes. A distributed edge computing environment is a distributed computing environment where the processing is distributed near to the point of use or creation of data as opposed to being located at a central server. This may for example provide for more robustness in the case of high network traffic or for maintaining a highly responsive and flexible microservice deployment system.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the disclosed methods, such as a microservice deployment scheduler 400. In addition to block 400, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 121 and the other storage media discussed below. The program instructions, and associated data, are accessed by processor set 110 to control and direct performance of the disclosed methods.

In computing environment 100, at least some of the instructions for implementing a method of using the microservice deployment scheduler 400 may be stored in persistent storage 113. For example, instructions may be used to control the computing environment to manage deployment and resource allocation of microservices in a distributed computing environment. The distributed computing environment comprises a microservice deployment scheduler and one or more computing nodes. The microservice deployment scheduler comprises a reinforcement learning based dynamic workload orchestration module. The method comprises: receiving microservice constraints descriptive of a microservice computing task by the microservice deployment scheduler; receiving node specific properties from the one or more computing nodes by the microservice deployment scheduler, wherein the node specific properties are descriptive of a computing capacity and/or computing capabilities of the one or more computing nodes; and orchestrating operation of the one or more computing nodes by the microservice deployment scheduler by inputting the microservice constraints and the node specific properties into the reinforcement learning based dynamic workload orchestration module.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the disclosed methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the disclosed methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service. Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
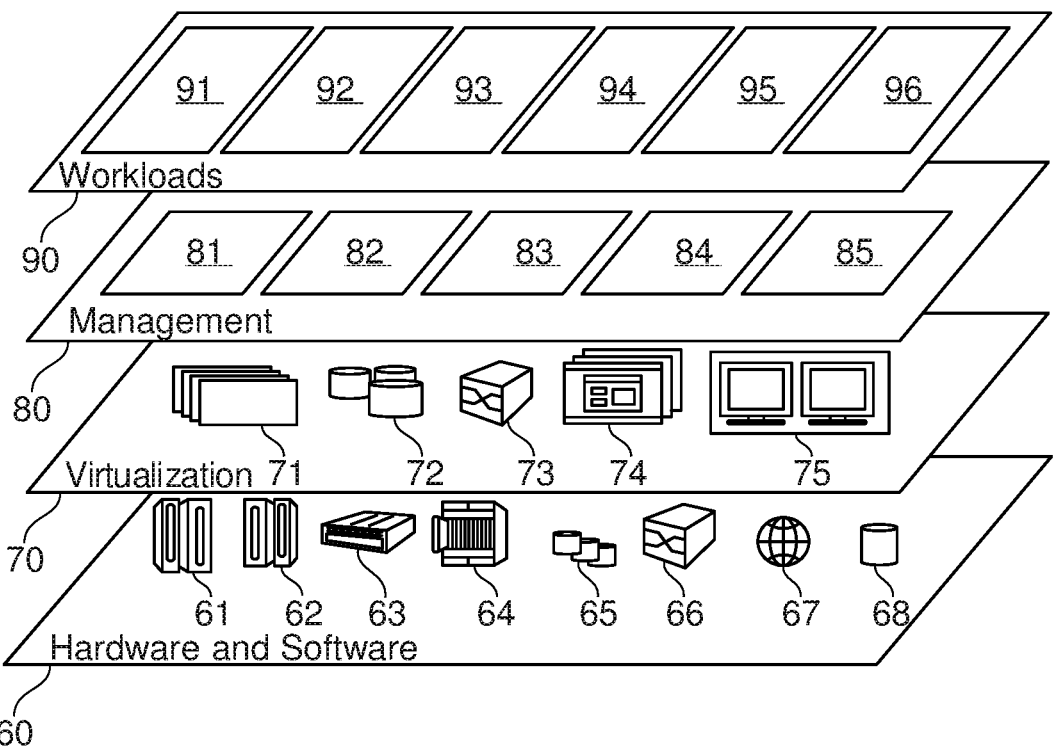
FIG. 3 depicts abstraction model layers according to an example of the present disclosure.

Referring now to FIG. 3, a set of functional abstraction layers provided by cloud computing environment 50 (FIG. 1) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and microservice deployment and scheduling 96 as was described in the context of FIG. 1.

Figure 4:
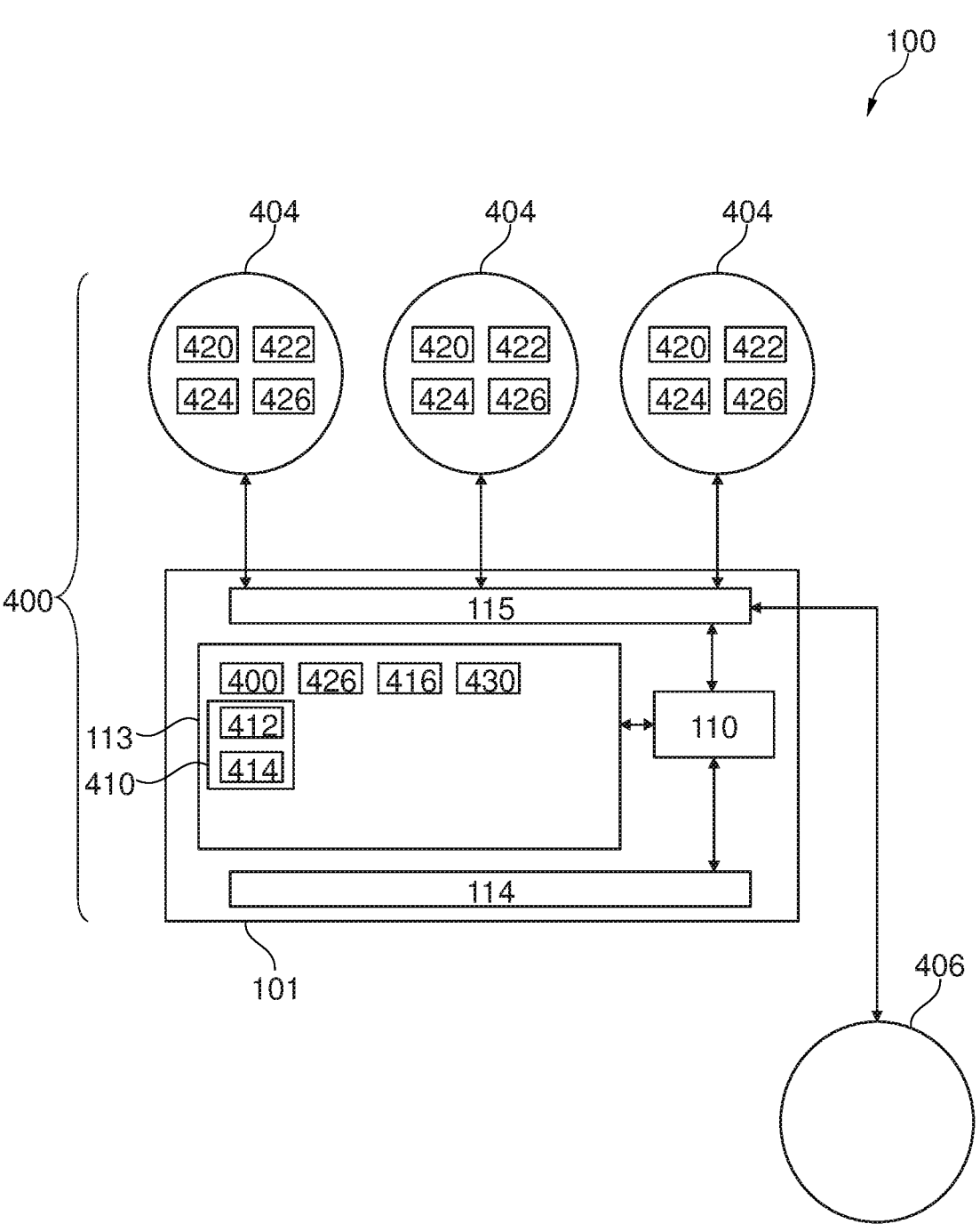
FIG. 4 shows a further view of the computing environment illustrated in FIG. 1.

FIG. 4 shows a further view of the computing environment 100. On the computer 101 the microservice deployment scheduler 400 is implemented. As was mentioned above, microservices are executable programs that may be independently deployable from each other, they may be loosely coupled, they may operate collectively, and in some instances, they may be organized around particular capabilities or computational tasks.

The computing environment 100 is shown as comprising a distributed computing environment 402 that comprises the computer 101 and a number of computing nodes 404. The network module 115 is shown as forming a network connection with each of the computing nodes 404 as well as with a database of microservices 406. The database of microservices 406 may provide microservices 420 to the computing nodes 404.

The computing nodes 404 are shown as containing implementations of various microservices 420. The computing nodes 404 are able to perform computing tasks in a distributed and possibly cooperative manner using microservices 420. Each node may have different microservices. The computing capabilities of the various nodes may change over time as different microservices 420 are distributed to them as well as the machine state may change over time.

The computing nodes 404 are shown as containing node-specific machine state data 424 that describes the computing and computational resources available to a particular computing node 404. The node specific machine state data 424 is therefore descriptive of the current computational state or capacity of a computing node 404.

The node specific machine state data 424 is however raw data and may not concisely describe the current computing capabilities of the computing node 404. The computing nodes are shown as having a trained machine learning module 422. The trained machine learning module rakes the node specific machine state data 424 as input and in response outputs the node-specific properties 426. In some examples the node specific properties 426 may be considered to be a classification of the computational capability of computing nodes 404. This may include the current workload as well as which microservices are available at a computing node 404 to perform tasks. The trained machine learning module 422 may for example be a classifier neural network. It receives the node-specific machine state data 424 and outputs the node-specific properties 426 as a classification. The node-specific properties 426 may then be transferred via the network module 115 of the computer 101 and then stored in the memory 113. Transmission of the node-specific properties 426 may require fewer network resources than transferring the entire node-specific machine state data 424.

The memory of the computer 113 is shown as containing a microservice deployment scheduler 410. The microservice deployment scheduler 140 uses the node specific machine state data 424 to perform orchestration of the computational nodes 404. The microservice deployment scheduler tries to reconcile microservice constraints 416, which is requested capacity to perform a computing task, with the available computing resources of the computational nodes, and is described by the microservice deployment scheduler 410.

The microservice deployment scheduler 410 optionally contains a rule-based dynamic rule-based optimization module 414 and it also contains a reinforcement learning-based dynamic workload orchestration module 412. If the rule-based dynamic rule-based optimization module 414 is present then typically it would be attempted to use this first to perform orchestration, and if the rules used by the rule-based dynamic rule-based optimization module 414 were not sufficient to match microservice constraints 416 with the computing resources available, as specified in the node-specific properties 426, then the reinforcement learning-based dynamic workload orchestration module 412 would then be used. During use of the reinforcement learning-based dynamic workload orchestration module 412 a reward function 418 can be used to train this module, 412, using reinforcement learning.

The network module 115 is also shown as connecting to the database of microservices 406. The computer 101 functions as a gateway between the database of microservices 406 and the computing nodes 404. In this configuration the computer 101 functions as a means of isolating the computing nodes 404 from a larger network. This may for example have advantages in reducing the susceptibility of the computing nodes 404 to attack as well as finding the topography of an edge computing environment.

FIG. 5 shows a flowchart which illustrates a method of operating the computing environment 100 shown in FIG. 4. In step 500 the current node-specific machine state data 424 is collected from the one or more computing nodes 404. This may be performed as it is illustrated in FIG. 4, where this data is collected locally. In other examples, this data could be forwarded to the computer 101. In step 502, the node-specific properties 426 are received in response to inputting the current node-specific machine state data 424 into the trained machine learning module 422. In step 404, the microservice constraints 416 are received by the computer 101. These may be provided to the microservice deployment scheduler 410. In step 506, the node-specific properties 426 are received. These for example may be received directly from the computing nodes 404. In step 508, orchestration of the one or more computing nodes by the microservice deployment scheduler 400 is performed by inputting the microservice constraints 416 and the node-specific properties 426 into the rule-based dynamic rule-based optimization module 414.

Step 508 is optional in some examples. The rules in the rule-based dynamic rule-based optimization module 414 may or may not be successful. For example, if rules do not exist for a particular situation, then this particular module 414 may fail. Box 510 is a decision box. The question is: were the rules successful. If the answer is "yes" then the orchestration was performed and the method proceeds to box 516, which is an end step. If the answer is "no," then the reinforcement learning-based dynamic workload orchestration module 412 is used. In this context, success of the rules means that the rules were applicable to resolve the constraints and the node-specific machine state data. If you have rules which are applicable to a particular situation, then the orchestration is performed according to the rules. If the rules are not applicable, then the reinforcement learning based dynamic orchestration module takes over.

In step 512, the orchestrating operation of the one or more computing nodes 404 by the microservice deployment scheduler 410 is performed by inputting the microservice constraints 416 and the node-specific properties 426 into the reinforcement learning-based dynamic workload orchestration module 412. In optional step 514, the reinforcement learning-based dynamic workload orchestration module 412 is trained during operation using a reward function 418.

The reinforcement learning-based dynamic workload orchestration module 412 may, for example, be implemented using a Deep Q Neural Network (DQNN) that is used to process the RL task. In this case the RL task may encompass deployment and resource allocation of microservices of a distributed computing environment. The classical Bellman Equation for the Q value may be augmented, which measures the overall reward of an action taken within the system, by a weight vector w, which denotes the weights and parameters of $$Q(s_t, a_t, w) = r(s_t, a_t) + \alpha * \max_{a_{t+1}}[Q(s_{t+1}, a_{t+1}, w) - \beta * Q(s_t, a_t, w)],$$

the DQNN, i.e., where alpha [0, 1] is the discount factor, as usually employed in Q learning, and beta [0, 1] is an additional factor that might be employed to center the future reward estimate towards the measured value and can optionally be learned for better performance and stability. Using above Q-target function, proceed by defining a mean-squared-error (MSE) measure for the loss function of said DQNN, i.e.

$$\mathcal{L} =$$

$$Q_{estimated}(s_t, a_t, w) - \left(r(s_t, a_t) + \alpha * \max_{a_{t+1}}[Q(s_{t+1}, a_{t+1}, w) - \beta * Q(s_t, a_t, w)]\right).$$

Next, said DQNN is trained based on available observations (some collected datasets) for a specified amount of epochs or until convergence, eventually yielding a policy π for optimal deployment and resource allocation of microservices of a distributed computing environment.

Incorporating Reinforcement Learning (RL) into microservice orchestration using Deep Q-Networks (DQN) may involve defining suitable states, actions, and rewards that capture the dynamics of the distributed microsystem.

The states are the current system observations, i.e., the current workload at the clients, potential use of resources, number of deployed microservices, etc. this may encompass quantities or properties of the system that can be monitored. The states may, for example, include one or more of the following:

Resource Utilization: CPU, memory, disk I/O, network I/O of each microservice instance.

Service Performance Metrics: Response time, throughput, error rates.

System Load: Overall load on the system, which could include factors like the number of requests per second.

Microservice Health: Indicators like up/down status, restart counts, etc.

Dependency Status: The health and performance of dependent services or databases.

The actions are the policies/rules which determine when to schedule what microservice in this system. This may encompass what may be adapted and may involve anything from removing a service, redeploying a service, orchestrating the microservice deployment, splitting, re-distributing, etc. The actions may, for example, include one or more of the following:

Scaling Actions: Scale up or down the number of instances of a microservice.

Resource Allocation: Increase or decrease allocated resources (CPU, memory) to a microservice.

Load Balancing Adjustments: Modify load balancing strategies or rules.

Service Restart/Recovery Actions: In case a service is down or performing poorly.

Configuration Changes: Adjusting configuration parameters of microservices or the orchestration platform.

The rewards are measurable quantities, in this case the reward can be closely tied to the service running, for example inference quality for ML tasks, or something very simple such as "Do I still have 2 GB ram left?" The rewards may, for example, include one or more of the following:

Performance Improvement: Positive reward for actions that lead to improved response times or throughput.

Cost Efficiency: Reward for reducing resource usage without impacting performance.

Stability: Positive reward for maintaining or improving the stability and health of the system.

SLA Compliance: Reward for actions that help in meeting or exceeding defined Service Level Agreements.

Penalties: Negative rewards for actions that lead to decreased performance, increased costs, or system instability.

In the context of DQN, these definitions may be translated into numerical values that the neural network can process. For instance, resource utilization can be expressed as a percentage, service performance can be measured in milliseconds or transactions per second, etc. In some examples, this may be accomplished by encoding these metrics into a state representation that the DQN can understand and learn from. During the reinforcement learning additional node-specific machine state data 424 and/or node-specific properties 426 may be collected to calculate the value of the reward function during the training.

Various examples may possibly be described by one or more of the following features in the following numbered clauses:

Clause 1. A computer implemented method of deployment and resource allocation of microservices of a distributed computing environment, wherein the distributed computing environment comprises a microservice deployment scheduler and one or more computing nodes, wherein the microservice deployment scheduler comprises a reinforcement learning based dynamic workload orchestration module, wherein the method comprises:

receiving microservice constraints descriptive of a microservice computing task by the microservice deployment scheduler;

receiving node specific properties from the one or more computing nodes by the microservice deployment scheduler, wherein the node specific properties are descriptive of a computing capacity and/or computing capabilities of the one or more computing nodes; and orchestrating operation of the one or more computing nodes by the microservice deployment scheduler by inputting the microservice constraints and the node specific properties into the reinforcement learning based dynamic workload orchestration module.

Clause 2. The computer implemented method of clause 1, wherein the microservice deployment scheduler further comprises a rule based dynamic workload orchestration module configured for orchestrating operation of the one or more computing nodes using a predetermined set of rules associated with the microservice constraints and the node specific properties, wherein the method further comprises orchestrating operation of the one or more computing nodes by the microservice deployment scheduler by inputting the microservice constraints and the node specific properties into the rule based dynamic workload orchestration module, wherein orchestration of the one or more computing nodes using the reinforcement learning based dynamic workload orchestration module is performed if the predetermined set of rules is not associated with the microservice constraints and the node specific properties.

Clause 3. The computer implemented method of clause 2, wherein the predetermined set of rules implements a multi-objective problem statement.

Clause 4. The computer implemented method of clause 1, 2, or 3, wherein the method further comprises training the reinforcement learning based dynamic workload orchestration module during operation using a reward function, wherein the reward function comprises any one of the following: resource utilization of the computing nodes, response time to the microservice constraints, cost efficiency of the computing nodes, energy consumption of the computing nodes, and combinations thereof.

Clause 5. The computer implemented method of any one of the preceding clauses, wherein the distributed computing environment is configured to receive microservice applications from a database of microservices for execution by the one or more computing nodes.

Clause 6. The computer implemented method of clause 5, wherein the microservice deployment scheduler is executed on a dedicated computing node, wherein the dedicated computing node functions as a gateway between the database of microservices and the one or more computing nodes.

Clause 7. The computer implemented method of any one of clauses 1 through 5, wherein execution of the microservice deployment scheduler is distributed amongst the one or more computing nodes.

Clause 8. The computer implemented method of any one of the preceding clauses, wherein the distributed computing environment comprises a trained machine learning module configured to output the node specific properties in response to receiving a current node specific machine state data as input, wherein the method further comprises:

collecting the current node specific machine state data from the one or more computing nodes; and receiving the node specific properties in response to inputting the current node specific machine state data into the trained machine learning module.

Clause 9. The computer implemented method of clause 8, wherein the trained machine learning module comprises a classifier neural network.

Clause 10. The computer implemented method of clause 8 or 9, wherein the current node specific machine state data comprises any one of the following: current resource utilization data, current workload data, current performance metric data, current processing power, current memory capacity, current storage capacity, current network bandwidth, current microservice resource requirements, current microservice response time objective, current microservice execution dependencies, current microservice communication patterns, current installed microservices, current response time, throughput, current energy consumption, current cost of processing, current cost of storage, and combinations thereof.

Clause 11. The computer implemented method of clause 8, 9, or 10, wherein the trained machine learning module is implemented on each of the one or more computing nodes, wherein the method further comprises receiving the node specific properties in response to inputting the node specific machine state data into the trained machine learning module of the respective computing node.

Clause 12. The computer implemented method of any one of clauses 8 through 10, wherein the trained machine learning module is further configured to receive historical machine state data as input when inputting the current node specific machine state data into the trained machine learning module, wherein the method further comprises inputting the historical machine state data into the trained machine learning module when inputting the current node specific machine state data into the trained machine learning module to determine the node specific properties.

Clause 13. The computer implemented method of clause 12, wherein the historical machine state data comprises anyone of the following: historical resource utilization data, historical workload data, historical performance metric data, historical processing power, historical memory capacity, historical storage capacity, historical network bandwidth, historical microservice resource requirements, historical microservice response time objective, historical microservice execution dependencies, historical microservice communication patterns, historical installed microservices, historical response time, historical throughput, historical energy consumption, historical cost of processing, historical cost of storage, and combinations thereof.

Clause 14. The computer implemented method of any one of the preceding clauses, wherein the distributed computing environment is a distributed edge computing environment, and wherein the computing nodes are edge nodes.

Clause 15. A computer program product comprising a computer-readable storage medium having computer-readable program code embodied therewith, said computer-readable program code configured to implement the method of any one of clauses 1 through 14.

Clause 16. A computer system comprising:

a processor configured for controlling said computer system; and a memory storing machine executable instructions and a microservice deployment scheduler, wherein the microservice deployment scheduler comprises a reinforcement learning based dynamic workload orchestration module, wherein execution of said instructions causes said processor to:

receive microservice constraints descriptive of a microservice computing task by the microservice deployment scheduler;

receive node specific properties from the one or more computing nodes by the microservice deployment scheduler, wherein the node specific properties a descriptive of computing capacity and computing capabilities of the one or more computing nodes; and orchestrate operation of the one or more computing nodes by the microservice deployment scheduler by inputting the microservice constraints and the node specific properties into the reinforcement learning based dynamic workload orchestration module.

Clause 17. The computer system of clause 16, wherein the microservice deployment scheduler further comprises a rule based dynamic workload orchestration module configured for orchestrating operation of the one or more computing nodes using a predetermined set of rules associated with the microservice constraints and the node specific properties, wherein execution of said instructions causes said processor to orchestrate operation of the one or more computing nodes by the microservice deployment scheduler by inputting the microservice constraints and the node specific properties into the rule based dynamic workload orchestration module, wherein orchestration of the one or more computing nodes using the reinforcement learning based dynamic workload orchestration module is performed by said processor if the predetermined set of rules is not associated with the microservice constraints and the node specific properties.

Clause 18. The computer system of clause 17, wherein the predetermined set of rules implements a multi-objective problem statement.

Clause 19. The computer system of clause 16, 17, or 18, wherein execution of said instructions further causes said processor to train the reinforcement learning based dynamic workload orchestration module during operation using a reward function, wherein the reward function comprises any one of the following: resource utilization of the computing nodes, response time to the microservice constraints, cost efficiency of the computing nodes, energy consumption of the computing nodes, and combinations thereof.

Clause 20. The computer system of any one of clauses 16 through 19, wherein the distributed computing environment is configured to receive microservice applications from a database of microservices for execution by the one or more computing nodes, wherein the microservice deployment scheduler is executed on a dedicated computing node, wherein the dedicated computing node functions as a gateway between the database of microservices and the one or more computing nodes.

What is claimed is:

1. A computer implemented method of deployment and resource allocation of microservices of a distributed computing environment, the distributed computing environment including a microservice deployment scheduler and one or more computing nodes, the microservice deployment scheduler including a reinforcement learning based dynamic workload orchestration module, the method comprising:

receiving microservice constraints descriptive of a microservice computing task by the microservice deployment scheduler, wherein the microservice deployment scheduler further includes a rule based dynamic workload orchestration module configured to orchestrate operation of the one or more computing nodes using a predetermined set of rules associated with the microservice constraints and node specific properties;

receiving the node specific properties from the one or more computing nodes by the microservice deployment scheduler, wherein the node specific properties are descriptive of a computing capacity and computing capabilities of the one or more computing nodes;

orchestrating operation of the one or more computing nodes by the microservice deployment scheduler by inputting the microservice constraints and the node specific properties into the reinforcement learning based dynamic workload orchestration module and by inputting the microservice constraints and the node specific properties into the rule based dynamic workload orchestration module; and orchestration of the one or more computing nodes using the reinforcement learning based dynamic workload orchestration module is performed if the predetermined set of rules is not associated with the microservice constraints and the node specific properties.

2. The computer implemented method of claim 1, wherein the predetermined set of rules implements a multi-objective problem statement.

3. The computer implemented method of claim 1, the method further comprising:

training the reinforcement learning based dynamic workload orchestration module during operation using a reward function, wherein the reward function includes at least one of: resource utilization of the computing nodes, response time to the microservice constraints, cost efficiency of the computing nodes, energy consumption of the computing nodes, or combinations thereof.

4. The computer implemented method of claim 1, wherein the one or more computing nodes of the distributed computing environment is configured to receive microservice applications from a database of microservices for execution by the one or more computing nodes.

5. The computer implemented method of claim 4, wherein:

the microservice deployment scheduler is executed on a dedicated computing node; and the dedicated computing node functions as a gateway between the database of microservices and the one or more computing nodes.

6. The computer implemented method of claim 1, wherein execution of the microservice deployment scheduler is distributed amongst the one or more computing nodes.

7. The computer implemented method of claim 1, wherein:

the distributed computing environment includes a trained machine learning module configured to output the node specific properties in response to receiving a current node specific machine state data as input; and the method further comprises:

collecting the current node specific machine state data from the one or more computing nodes; and receiving the node specific properties in response to inputting the current node specific machine state data into the trained machine learning module.

8. The computer implemented method of claim 7, wherein the trained machine learning module includes a classifier neural network.

9. The computer implemented method of claim 7, wherein the current node specific machine state data includes at least one of: current resource utilization data, current workload data, current performance metric data, current processing power, current memory capacity, current storage capacity, current network bandwidth, current microservice resource requirements, current microservice response time objective, current microservice execution dependencies, current microservice communication patterns, current installed microservices, current response time, throughput, current energy consumption, current cost of processing, current cost of storage, or combinations thereof.

10. The computer implemented method of claim 7, wherein:

the trained machine learning module is implemented on each of the one or more computing nodes; and the method further comprises receiving the node specific properties in response to inputting the node specific machine state data into the trained machine learning module of the respective computing node.

11. The computer implemented method of claim 7, wherein:

the trained machine learning module is further configured to receive historical machine state data as input when inputting the current node specific machine state data into the trained machine learning module; and the method further comprises inputting the historical machine state data into the trained machine learning module when inputting the current node specific machine state data into the trained machine learning module to determine the node specific properties.

12. The computer implemented method of claim 11, wherein the historical machine state data includes at least one of: historical resource utilization data, historical workload data, historical performance metric data, historical processing power, historical memory capacity, historical storage capacity, historical network bandwidth, historical microservice resource requirements, historical microservice response time objective, historical microservice execution dependencies, historical microservice communication patterns, historical installed microservices, historical response time, historical throughput, historical energy consumption, historical cost of processing, historical cost of storage, or combinations thereof.

13. The computer implemented method of claim 1, wherein:

the distributed computing environment is a distributed edge computing environment; and the computing nodes are edge nodes.

14. A computer program product comprising a computer-readable storage medium having computer-readable program code embodied therewith, said computer-readable program code configured to implement a method, the method comprising:

receiving microservice constraints descriptive of a microservice computing task by a microservice deployment scheduler, wherein the microservice deployment scheduler further includes a rule based dynamic workload orchestration module configured to orchestrate operation of the one or more computing nodes using a predetermined set of rules associated with the microservice constraints and node specific properties;

receiving the node specific properties from one or more computing nodes by the microservice deployment scheduler, wherein the node specific properties are descriptive of a computing capacity and computing capabilities of the one or more computing nodes;

orchestrating operation of the one or more computing nodes by the microservice deployment scheduler by inputting the microservice constraints and the node specific properties into a reinforcement learning based dynamic workload orchestration module and by inputting the microservice constraints and the node specific properties into the rule based dynamic workload orchestration module; and orchestration of the one or more computing nodes using the reinforcement learning based dynamic workload orchestration module is performed if the predetermined set of rules is not associated with the microservice constraints and the node specific properties.

15. A computer system comprising:

a processor configured for controlling said computer system; and a memory storing machine executable instructions and a microservice deployment scheduler, the microservice deployment scheduler comprising a reinforcement learning based dynamic workload orchestration module, wherein execution of said instructions causes said processor to:

receive microservice constraints descriptive of a microservice computing task by the microservice deployment scheduler, wherein the microservice deployment scheduler further comprises a rule based dynamic workload orchestration module configured for orchestrating operation of one or more computing nodes using a predetermined set of rules associated with the microservice constraints and node specific properties;

receive the node specific properties from one or more computing nodes by the microservice deployment scheduler, wherein the node specific properties are descriptive of computing capacity and computing capabilities of the one or more computing nodes; and orchestrate operation of the one or more computing nodes by the microservice deployment scheduler by inputting the microservice constraints and the node specific properties into the reinforcement learning based dynamic workload orchestration module and by inputting the microservice constraints and the node specific properties into the rule based dynamic workload orchestration module; and orchestration of the one or more computing nodes using the reinforcement learning based dynamic workload orchestration module is performed by said processor if the predetermined set of rules is not associated with the microservice constraints and the node specific properties.

16. The computer system of claim 15, wherein the predetermined set of rules implements a multi-objective problem statement.

17. The computer system of claim 15, wherein:

execution of said instructions further causes said processor to train the reinforcement learning based dynamic workload orchestration module during operation using a reward function; and the reward function includes at least one of: resource utilization of the computing nodes, response time to the microservice constraints, cost efficiency of the computing nodes, energy consumption of the computing nodes, or combinations thereof.

18. The computer system of claim 15, wherein:

the one or more computing nodes of a distributed computing environment is configured to receive microservice applications from a database of microservices for execution by the one or more computing nodes;

the microservice deployment scheduler is executed on a dedicated computing node; and the dedicated computing node functions as a gateway between the database of microservices and the one or more computing nodes.

* * * * *